United States Patent [19]

Hartig

[11] 4,331,378

[45] May 25, 1982

[54] REINFORCED OPTICAL FIBER CABLE WITH GLASS OR SILICA CORE

[75] Inventor: Martval J. Hartig, Wilmington, Del.

[73] Assignee: E. I. Du Pont de Nemours and Company, Wilmington, Del.

[21] Appl. No.: 22,844

[22] Filed: Mar. 22, 1979

Related U.S. Application Data

[63] Continuation of Ser. No. 734,749, Oct. 22, 1976, abandoned.

[51] Int. Cl.³ ............................................... G02B 5/14
[52] U.S. Cl. ................................................. 350/96.23
[58] Field of Search ..................................... 350/96.23

[56] References Cited

U.S. PATENT DOCUMENTS

| | | | |
|---|---|---|---|
| 3,710,006 | 1/1973 | Davis | 350/96.23 |
| 3,813,098 | 5/1974 | Fischer et al. | 273/DIG. 7 |
| 3,869,430 | 3/1975 | Blades | 57/140 R |
| 4,000,936 | 6/1977 | Gloge | 350/96.23 |
| 4,017,579 | 4/1977 | Roe et al. | 174/107 |
| 4,037,922 | 7/1977 | Claypoole | 350/96.23 |
| 4,037,923 | 7/1977 | Beal | 350/96.23 |
| 4,113,349 | 9/1978 | Stiles | 350/96.23 |
| 4,169,657 | 10/1979 | Bedard | 350/96.23 |

FOREIGN PATENT DOCUMENTS

| | | | |
|---|---|---|---|
| 2291508 | 1/1976 | France | 350/96.23 |
| 2296192 | 7/1976 | France | 350/96.23 |

*Primary Examiner*—John D. Lee

[57] ABSTRACT

A reinforced optical fiber cable comprises (i) an optical filamentary material with a glass or silica core and a lower index of refraction sheath, (ii) a reinforcement comprising at least two polymeric fibers having an elastic modulus above 10,000,000 psi, said fibers being held under tension separate from one another and positioned substantially parallel to the longitudinal axis of the core with substantially zero twist and (iii) a jacket which holds the reinforcement under tension.

14 Claims, No Drawings

REINFORCED OPTICAL FIBER CABLE WITH GLASS OR SILICA CORE

CROSS-REFERENCE TO RELATED APPLICATION

This application is a continuation of my prior copending United States application Ser. No. 734,749 filed Oct. 22, 1976, now abandoned.

BACKGROUND OF THE DISCLOSURE

The present invention relates to an optical fiber cable containing at least one optical filamentary material having a glass or silica core and a lower index of refraction sheath.

Optical filamentary materials are well known in the art for transmission of light along a filament length by multiple internal reflections of light. Great care is taken to minimize light losses along the length of the filament or, in other words, internal reflections are made as total as possible so that light applied to one end of the optical filamentary material is efficiently transmitted to the opposite end of the material. The light transmitting portion or core of the optical filamentary material is surrounded by a sheath having a lower index of refraction which minimizes the escape or absorption of light along the length of the filament. This sheath is normally transparent since an opaque sheath tends to absorb light. Although this sheath can be made from glass or a polymeric material, it is conventionally made from the latter due to increased toughness properties.

Optical filamentary materials can be divided into two general classes dependent upon the type of optically transparent core material. A first class of core material is thermoplastic in nature while a second class is made from glass or silica. The first class is generally superior both in toughness and in ease of making connections while the second class is generally superior in light transmission.

One disadvantage with optical filamentary materials with a glass or silica core is a tendency for the core to break due to its brittleness. Encapsulation of the filaments within a cable containing reinforcement and a protective layer has only been partially successful in overcoming the brittle quality of the core. A need exists for an optical fiber cable which provides increased resistance to breakage of a brittle core material.

SUMMARY OF THE INVENTION

The present invention relates to a cable for transmission of light comprising
 (A) a substantially cylindrical core of an optically transparent glass or silica,
 (B) a transparent sheath for (A) having an index for refraction at least 0.1% lower, and
 (C) a reinforcement for the cable,
 (D) a jacket exterior of (A) and (B),
wherein the improvement comprises the reinforcement of (C) comprising at least two polymeric fibers spaced from one another
  (i) having an elastic modulus of at least 10,000,000 psi;
  (ii) being under tension;
  (iii) being substantially parallel to the core along its longitudinal axis;
  (iv) being positioned with substantially zero twist;
  (v) being interspaced between (B) and (D).

DETAILED DESCRIPTION OF THE INVENTION

An optically transparent cylindrical core for transmission of light is made from an optically transparent glass or silica. The silica core can be either pure silica (undoped) or doped with a suitable component such as germanium or boron. As employed herein "optically transparent" means a light transmission of at least 50% per 30 cms in a portion of the light spectrum of 550 to 1100 nanometers. This degree of transmission need not extend over the entire spectrum. Examples of suitable disclosure of core materials are found in U.S. Pat. Nos. 3,480,458 and 3,508,589, e.g., the latter patent lists suitable core materials made from barium, flint and borosilicate glasses with the more dense glasses described as better.

A preferred core material is made from silica which can be either doped or undoped. The silica is drawn into a core material at elevated temperature. Although drawing temperatures of at least 2000° C. can be employed, a temperature range of 2040° C. to 2120° C. is preferred. As drawing temperature decreases, it has been found that brittleness of the drawn silica core material increases. A limiting factor on an upper temperature range is difficulty in control of caliper. As the drawing temperature is maximized, a necessary degree of caliper control becomes marginal.

The diameter of the cylindrical optically transparent core varies from relatively thin to relatively thick core constructions. A suitable diameter range is 10 to 400 μm. A thick core has the advantage in the ability to capture a greater proportion of incident light if the light source is large, e.g., from an LED (light emitting diode) but has the disadvantage of having a larger bending radius. If a light source is small, e.g., a laser, a relatively thin core is suitable for capturing incident light.

The sheath applied to the optically transparent core is transparent and has an index of refraction at least 0.1% lower and can be glass, silica or a substantially amorphous optically transparent thermoplastic polymeric material. Pure silica has a lower index of refraction than most known glasses, and if silica is employed for both core and sheath, the silica core is doped to raise its index of refraction to a required level at least 0.1% above the sheath.

Preferred as a material of construction for the sheath is a substantially amorphous transparent thermoplastic polymer since such polymer does not possess the brittleness characteristic of glass or silica.

Examples of suitable sheath materials include those disclosed in British Patent Specification No. 1,037,498 such as polymers and interpolymers of vinyl fluoride, vinylidene fluoride, tetrafluoroethylene, hexafluoropropylene, trifluoromethyltrifluorovinyl ether, perfluoropropyltrifluorovinyl ether and fluorinated esters of acrylic or methacrylic acids having the structure

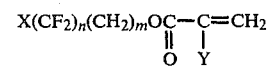

wherein X is selected from the group consisting of F, H, or Cl, and n is an integer of from 2 to 10, m is an integer from 1 to 6 and Y is either $CH_3$ or H.

Since the sheath material reflects light traveling through the core, the thickness of the sheath is not generally critical. An example of a suitable range of thickness of this sheathing is 2 to 500 microns. Excessive sheathing thicknesses can reduce flexibility of the final cable which is undesirable.

Well-known techniques for application of the sheath material are suitable. Glass or silica can be applied by a double crucible drawing while a polymer can be extruded onto the core.

In the present invention, it is necessary to incorporate a reinforcement between the optical filamentary material and the protective jacket. This reinforcement comprises polymeric fiber having an elastic modulus of at least 10,000,000 psi. Suitable polymer for the fibers which meet this criteria include poly(p-phenylene terephthalamide) and is disclosed in U.S. Pat. No. 3,869,430. The disclosure of this patent is incorporated by reference herein.

At least two separate individual fibers are employed and are held under tension in the cable by the jacket material. The fibers are spaced apart and do not contact one another. Preferably, separate bundles of fibers, i.e., yarns, are employed as opposed to individual fibers. Although two separate fibers or yarns are suitable, more preferably at least four separate fibers or yarns are employed and most preferably, six or more fibers or yarns. These fibers are positioned substantially parallel to the core along its longitudinal axis. The fibers in relationship to the longitudinal axis of the core will have substantially zero twist. The term "zero twist" means that a fiber would not encircle the core material irrespective of the length of such material.

The purpose of having the fibers substantially parallel to the longitudinal axis of the core with substantially zero twist is to ensure the fibers remain under tension in the optical fiber cable. If the fibers for reinforcement encircled the core material, relaxation of this reinforcement could readily occur. Although the degree of tension of the reinforcement fiber is not critical, nevertheless it is essential that the fibers remain under tension in the cable. This tension can readily be demonstrated in a final cable. The cable is cut crosswise and the optical filamentary material of the glass or silica core and its sheath can be physically felt to protrude slightly from the cut end of the cable.

The optical filamentary material of a glass or silica core and lower index of refraction sheath is positioned within a protective jacket. The jacket serves to hold the reinforcement under tension and with this proviso the material for the jacket is not critical. The jacket is conventionally a thermoplastic polymer applied by extrusion. Suitable materials of construction include polyamides, copolyetheresters, polyurethanes, polyolefins (homopolymers and copolymers including ionomers) such as polyethylene and polypropylene, and melt extrudable fluorocarbons such as tetrafluoroethylene/hexafluoropropylene copolymers and melt extrudable chlorine-containing polymers such as polyvinyl chloride.

Considerations which govern the choice of jacketing material include strength, elongation, burning rate and ease of strippability. For example, good strippability is needed in connecting one cable to another and in connecting a cable to a light source or detector.

The optical fiber cable of the present invention provides a cable with a glass or silica core which is highly resistant to breakage of this light transmission portion. Cables containing an optical filamentary material of a glass or silica core and a lower index of refraction sheath are known in the prior art. In the cable of the present invention the manner of reinforcement in protection of a glass or silica core results in a superior ability to withstand breakage of the core material in comparison to prior art cables used for the transmission of light with an identical core and sheath material.

The cable of the present invention has a combination of high bending strength, high tensile strength and high impact strength. This combination of properties has not been obtained by cables with a brittle core which do not have reinforcement fibers held under tension.

It is possible with the construction of the present optical fiber cable to obtain a construction which permits the cable to be bent sharply without damage. A minimum bend diameter at least equal to about 6 mm and preferably at least equal to about 4 mm can be obtained. As shown in Example 2, the cable can be tied into a tight overhand knot, e.g. having a minimum bend diameter at least equal to about 4 mm without the cable losing its ability to function in a normal fashion in transmission of light.

Although the disclosure herein has been directed to interspacing a reinforcement under tension between a sheath of an optical filamentary material and a jacket, it is understood that the reinforcement need not contact the sheath. A protective layer can separate the sheath from the reinforcement. In such case, it remains critical for the reinforcement fibers to be maintained under tension.

Also, it is within the scope of the present invention to employ more than one optical filamentary material within a cable provided such filamentary material has a separate reinforcement of at least two reinforcement fibers in the manner disclosed herein.

To further illustrate the present invention, the following examples are provided.

EXAMPLE 1

Part I-An undoped silica fiber was spun at a temperature of 2050° C. from 9 mm. rod using a furnace with a tungsten heating element blanketed with nitrogen. The rod feed to the furnace and the take-off for the fiber were set to make 200 $\mu$m fiber at about 10 meters per minute. During spinning less than one break per 1000 meters was observed. The fiber was solution coated with a lower index substantially amorphous transparent polymeric sheath of methyl methacrylate and fluorinated esters of methacrylic acid (second order transition temperature of 50° C. and refractive index 6% lower than core) in a solvent of difluorotetrachloroethane to make an optical fiber with about a 600 $\mu$m outer diameter.

The optical fiber had an attenuation of 38 dB per kilometer at 655.3 nm.

Part II-The optical fiber of Part I was reinforced with six strands of poly(p-phenylene terephthalamide) of 42 tex (380 denier) and jacketed with copolyetherester (disclosed in Example 1 of U.S. Pat. No. 3,651,014).

Six strands of poly(p-phenylene terephthalamide) were initially strung through tensioning holders, through a fiber guide which was a hypodermic needle 1550 $\mu$m I.D. (inner diameter), 2050 $\mu$m O.D. (outer diameter) and through a crosshead die with an 1875 $\mu$m hole. Tension of the yarns was set at $1.16 \times 10^{-3}$ Newtons/tex (0.013 gram/denier) and the copolyetherester which was heated to 205° C. was extruded from the opening of the die. The extrusion speed and the speed of the yarns were adjusted to give an extrudate 175 $\mu$m O.D. A blank nylon filament 550 $\mu$m O.D. was fed into the yarn bundle and the speed readjusted to give an extrudate 1875 μm in diameter. The die was adjusted to center the fiber and the yarns. The nylon filament was removed and a coated optical fiber of Part I was substituted and coated with the copolyetherester to form an optic fiber cable.

The optic fiber cable had an attenuation of 40 dB per kilometer at 655.3 nm (in comparison to 38 dB per kilometer of the Part I optic fiber). The cable was tested under a load and it broke at 30 kg. The cable could be hammered without destroying its ability to transmit light. The cable could be wrapped around a 6 mm diameter mandrel without breakage of the core and loss of ability to transmit light but the cable could not be tied into a tight knot without breaking the core.

EXAMPLE 2

The procedure of Example 1—Parts I and II were followed except that Example 1—Part I optical fiber was directly coated with copolyetherester (described in Example 1 of U.S. Pat. No. 3,651,014) by a tubing crosshead die prior to the method of Example 1—Part II in application of the reinforcement and the jacketing copolyetherester. The optical fiber had an O.D. of 1225 μm. In the Example 1—Part II method of reinforcement, yarns of poly(p-phenylene terephthalamide) fibers were used, three yarns of 42 tex (380 denier) and three yarns of 168 tex (1420 denier). The tension of the fibers was $1.8 \times 10^{-3}$ newtons/tex (0.02 g/denier).

The final optic fiber cable had an O.D. of 2375 μm, an attenuation of 40 dB per kilometer at 655.3 nm and a break strength of 85 kg. The cable could be wrapped on a 4 mm diameter mandrel and tied into a tight overhand knot without breaking or loss of light transmission.

What is claimed is:

1. A cable for transmission of light comprising:
   (A) a substantially cylindrical core of an optically transparent glass or silica;
   (B) a transparent sheath for (A) having an index of refraction at least 0.1% lower;
   (C) a protective layer on (B);
   (D) a reinforcement for the cable, on (C), of at least two polymeric fibers spaced from one another and (i) having an elastic modulus of at least 10,000,000 psi, (ii) being under tension, (iii) being substantially parallel to the core along its longitudinal axis and, (iv) being positioned with substantially zero twist; and
   (E) a jacket exterior of (A), (B), (C) and (D), holding (D) under tension.

2. The cable of claim 1 wherein said fibers are poly(p-phenylene terephthalamide).

3. The cable of claim 1 wherein said fibers are present in separate yarns.

4. The cable of claim 3 wherein at least four yarns are present.

5. The cable of claim 4 wherein at least six yarns are present.

6. The cable of claim 1 with a minimum bend diameter at least equal to about 6 mm.

7. The cable of claim 6 with a minimum bend diameter at least equal to about 4 mm.

8. The cable of claim 1 wherein said transparent sheath is a substantially amorphous thermoplastic polymer extruded onto said core.

9. The cable of claim 1 wherein said protective layer is a copolyetherester.

10. A fiber optical cable comprising:
    a fiber optic core including at least one optical fiber adapted to receive optical communication signals;
    at least two elastic strength members substantially straight and parallel to said fiber optic core; said strength members being in a stretched condition;
    a protective layer between the core and the elastic strength members;
    means for maintaining said strength members substantially straight and in a stretched condition whereby said strength members are adapted to apply a force in the opposite direction to longitudinal stress forces on said cable for protecting said optical fiber from longitudinal stress.

11. A cable as set forth in claim 10 wherein said at least two elastic strength members is taken from the group consisting of Kevlar ®, nylon and polyester.

12. A cable as set forth in claim 10 wherein said at least two elastic strength members has a tensil modulus in the range of $7 \times 10^6$ pounds per square inch to $19 \times 10^6$ pounds per square inch.

13. A cable as set forth in claim 10 wherein said at least two elastic strength members will not substantially elongate under forces equal to the break strength of the fiber optic core.

14. A fiber optic cable comprising:
    a fiber optic core having at least one glass fiber;
    a plurality of strength members, said strength members being substantially straight and having been stretched beyond their normal length;
    a protective layer between the core and the strength members;
    means for maintaining said strength members substantially straight and in a stretched condition; and
    a protective sheath surrounding said core and said strength members.

* * * * *